United States Patent
Akers et al.

(10) Patent No.: US 6,304,013 B1
(45) Date of Patent: Oct. 16, 2001

(54) LINE TERMINATION NETWORK ASSEMBLY FOR AN ELECTRIC MOTOR

(75) Inventors: Jeffrey S. Akers, Lenoir, NC (US); John L. Oldenkamp, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/400,374

(22) Filed: Sep. 21, 1999

Related U.S. Application Data

(60) Provisional application No. 60/141,609, filed on Jun. 30, 1999.

(51) Int. Cl.$^7$ .................................................... H02K 11/00
(52) U.S. Cl. ............................ 310/68 R; 310/51; 310/89; 363/96; 361/119
(58) Field of Search ................................ 310/68 R, 68 D, 310/51, 71, 72, 89, 91; 317/13 R, 16, 31, 41, 50, 61.5; 318/800; 363/96; 361/110, 120

(56) References Cited

U.S. PATENT DOCUMENTS

| | | |
|---|---|---|
| 1,062,083 | 5/1913 | Creighton . |
| 1,093,477 | 4/1914 | Rüdenberg . |
| 1,738,726 | 12/1929 | Philip . |
| 2,246,926 * | 6/1941 | Roman .................................. 172/237 |
| 3,668,507 * | 6/1972 | Kadomsky et al. ................... 321/11 |
| 3,675,110 | 7/1972 | Kelley, Jr. . |
| 3,736,548 * | 5/1973 | Double ................................. 339/125 |
| 3,894,274 | 7/1975 | Rosenberry, Jr. . |
| 4,451,750 * | 5/1984 | Heuer et al. ............................ 310/88 |
| 4,494,163 * | 1/1985 | Yelland et al. ....................... 361/110 |
| 5,570,260 | 10/1996 | Kanai et al. . |
| 5,686,806 | 11/1997 | Hibbard . |
| 5,872,410 * | 2/1999 | Sudoff ................................. 310/68 R |
| 5,990,654 * | 11/1999 | Skibinski et al. ..................... 318/800 |

* cited by examiner

*Primary Examiner*—Nestor Ramirez
*Assistant Examiner*—Thanh Lam
(74) *Attorney, Agent, or Firm*—Carl Horton, Esq.; Damian Wasserbauer, Esq.; Armstrong Teasdale LLP

(57) ABSTRACT

An electric motor to be used with a termination network that is integral with the motor and connected to the motor's supply motor lines for reducing voltage between a motor terminal and a transmission line connected to a pulse width modulated drive when high frequency surges, or spikes, are present. Further, the termination network will not adversely effect sinusoidal performance ratings of the motor on which it is used. In addition, since the termination network is integral with the motor, the termination network assembly can be installed during assembly of the motor, thus lowering the cost of installation.

11 Claims, 2 Drawing Sheets

LINE TERMINATION NETWORK ASSEMBLY FOR AN ELECTRIC MOTOR

CROSS REFERENCE TO RELATED APPLICATION

This application claims the benefit of U.S. Provisional Application No. 60/141,609, filed Jun. 30, 1999.

BACKGROUND OF THE INVENTION

This invention relates generally to electric motors and, more particularly, to a circuit for reducing voltage stresses, or surges, between a cable and an electric motor.

Voltage stresses and surges are generally recognized as undesirable for electric motors for a variety of reasons. For example, surges often present voltages to a motor having a high amplitude and steep wave front which can damage supply line insulation or damage a stator winding's first coil.

The steep wave front can lead to non-uniform distribution of the increased voltage through the winding. Generally the first coil, which is connected to the motor supply lead, takes the largest portion of the voltage. The non-uniform distribution of the voltage through the first coil can lead to premature motor failure.

Electric motors may include an inverter, such as a pulse width modulated (PWM) inverter, to supply a series of pulses to the motor. These pulses travel along the transmission line to the motor and can have steep wave fronts. Since the motor generally has a higher surge impedance than the transmission line, a reflection may occur which causes the voltage at the motor to increase by a ratio of $2 Z_m/(Z_m+Z_0)$ where $Z_m$ is the surge impedance of the motor and $Z_0$ is the surge impedance of the transmission line. The motor impedance may be many times the surge impedance of the line.

Accordingly, it would be desirable to reduce, or eliminate, the reflection of the pulse along the transmission line.

BRIEF SUMMARY OF THE INVENTION

In an exemplary embodiment of the invention, a line termination network, integral with an electric motor, minimizes the reflection of pulses along a transmission line. The termination network includes a resistor and a capacitor connected in series across each phase of the motor.

For a three phase motor, the termination network includes three resistors and three capacitors, one of each connected in series, and the three capacitor and resistor series-connections are connected in a wye or delta connection configuration. A capacitor connected between each of two supply motor lines is initially uncharged and initially operates as a short circuit when exposed to the steep wave fronts of a pulse voltage. In these circumstances, the associated series-connected resistors have a total resistive value across the two supply motor lines equal to that of the high frequency surge impedance of the supply motor lines. When a peak pulse voltage or high amplitude voltage is transmitted, the charge across the capacitor becomes equal to that of the power source and the capacitor operates as an open circuit across the two supply lines. The capacitor filters and reduces the high amplitude pulse voltage within the circuit and effectively removes the associated series-connected resistors from the circuit. The values for the resistors are chosen such that a high frequency surge impedance approximately matches that of a cable connected to the electric motor.

The termination network is internal to the motor and is a component of a termination network assembly which is mounted in close proximity to a pair of motor end windings. Alternatively, the termination network assembly may be located near either or both of the end windings.

The termination network will reduce the peak voltage between a motor terminal and a transmission line connected to a pulse width modulated drive when high frequency surges, or spikes, are present. The reduced voltage allows motors with typical insulation systems to be used on adjustable speed drives without requiring special magnet wire or additional insulation systems. Further, the termination network will not adversely effect sinusoidal performance ratings of the motor on which it is used. In addition, since the termination network is integral with the motor, the termination network can be installed during assembly of the motor, thus lowering the cost of installation.

DETAILED DESCRIPTION OF THE INVENTION

Figure 1:
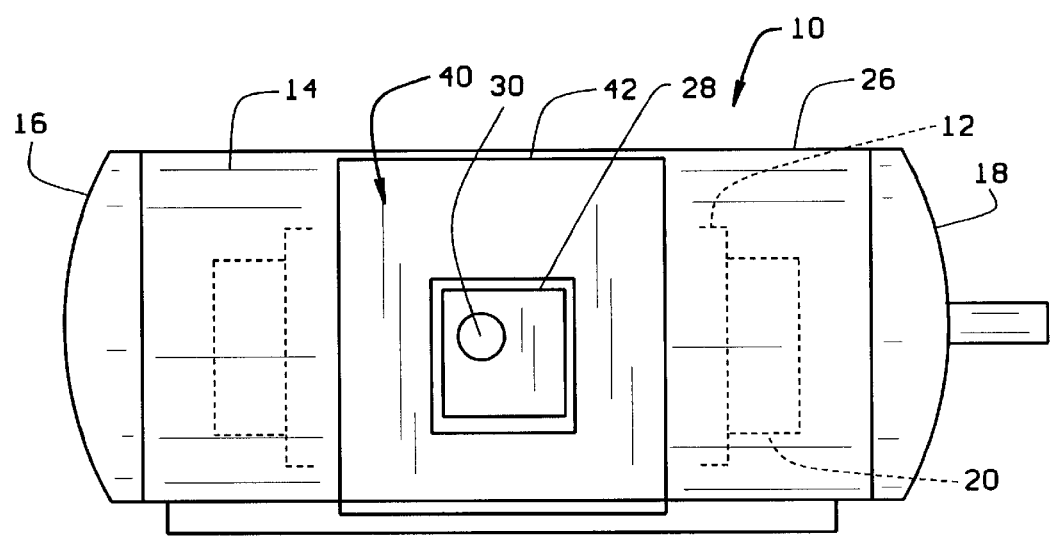
FIG. 1 is a schematic view of an electric motor including a line termination network assembly.

FIG. 1 is a schematic view of an electric motor 10 including a stator 12 positioned within a motor shell 14. Motor 10 also includes a pair of end shields 16, 18 mounted to shell 14 and a rotor 20 positioned within stator 12. End shields 16, 18 and shell 14 form a cavity (not shown) with in which stator 12 is positioned. Stator 12 includes a plurality of stator windings (not shown) that form a pair of end windings (not shown).

Shell 14 includes an outer surface 26 upon which an outlet box, or terminal junction box, 28 is attached. Box 28 is mounted adjacent an opening 30 in shell 14 and provides a central location through which supply motor lines (not shown) of motor 10 are routed. Outlet box 28 also provides quick access to electrical connections (not shown) within motor 10 without requiring disassembly of shell 14. Motor 10 further includes a network termination assembly 40 integral with motor 10. Network termination assembly 40 includes a termination network, or network terminator (not shown in FIG. 1) as will be described in detail below. A cable (not shown), electrically connects motor 10 to the termination network which is connected to a power source (not shown). Termination networks are widely applicable and can be used to protect various types of electric motors.

Network termination assembly 40 includes an insulated electronic circuit board (not shown) on which is mounted the network terminator, and a substantially rectangular plate. The insulated electronic circuit board (not shown) is integrally mounted between outlet box 28 and motor 10 on mounting plate 42 of network termination assembly 40. In an alternative embodiment, the mounting plate is shaped to accommodate a specific motor or outlet box. Additionally, the mounting plate 42 may include cooling fins (not shown). Mounting plate 42 may be constructed from, but is not limited to, cast iron, cast aluminum, or fabricated steel.

Figure 2:
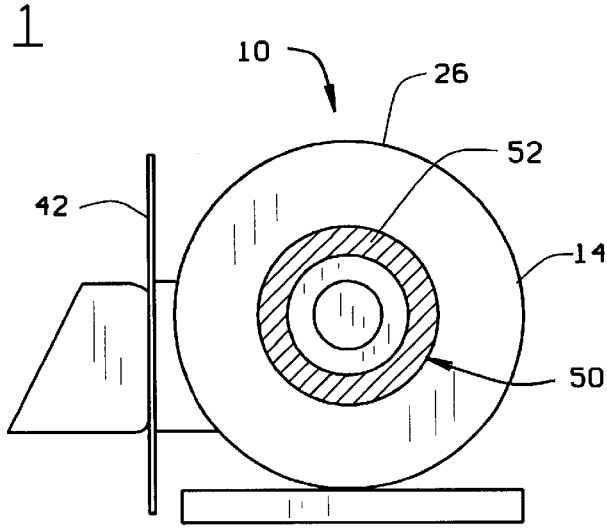
FIG. 2 is a schematic side view of the electric motor shown in FIG. 1 including a second embodiment of a line termination network assembly.

FIG. 2 is a schematic side view of electric motor 10 including a second embodiment of a network termination assembly 50. A network terminator (not shown in FIG. 2), that is similar to the network terminator described in FIG. 1, is mounted to termination network assembly 50 and is electrically connected to motor 10. Termination network assembly 50 is internal to motor 10 and is positioned within the motor cavity (not shown) in close proximity to one, or both, of the end windings (not shown). Network terminator assembly 50 includes a mounting plate 52 which is generally annular in shape. In an alternative embodiment, mounting plate 52 has an irregular circumference and accommodates external components present in the motor cavity (not shown). Network terminator assembly 50 may also include cooling fins (not shown). Mounting plate 52 may be constructed from, but is not limited to, cast iron, cast aluminum, or fabricated steel.

Figure 3:
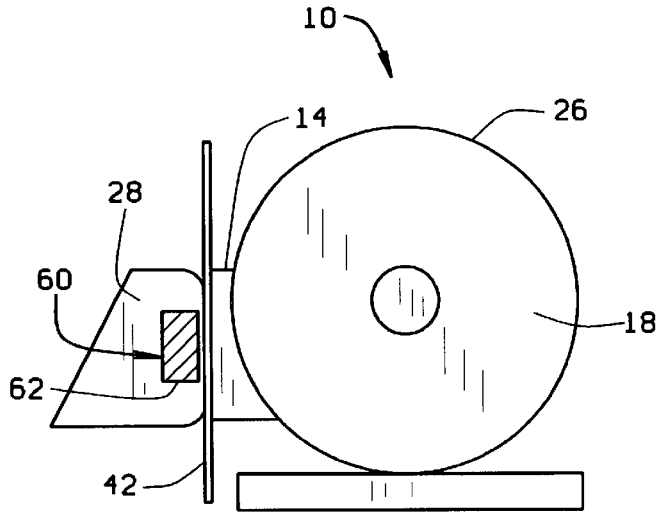
FIG. 3 is a schematic side view of the electric motor shown in FIG. 1 including a third embodiment of a line termination network assembly.

FIG. 3 is a schematic side view of electric motor 10 including a third embodiment of a line termination network assembly 60. Motor 10 includes outlet box 28 through which the supply motor lines (not shown) are routed. Termination network assembly 60 includes a network terminator (not shown in FIG. 3) mounted to a mounting plate 62. The network terminator is electrically connected to the supply motor lines (not shown) and may be connected by soldering or mechanical splicing. Mounting plate 62 is mounted to motor 10 in close proximity to, or directly to, outlet box 28 to minimize the physical distance for the connections between the network terminator and motor 10. Mounting plate 62 is generally rectangular in shape. In an alternative embodiment, the mounting plate has an irregular shape to accommodate external components present on the motor shell. Mounting plate 62 may be constructed from, but is not limited to, cast iron, cast aluminum, or fabricated steel.

Figure 4:
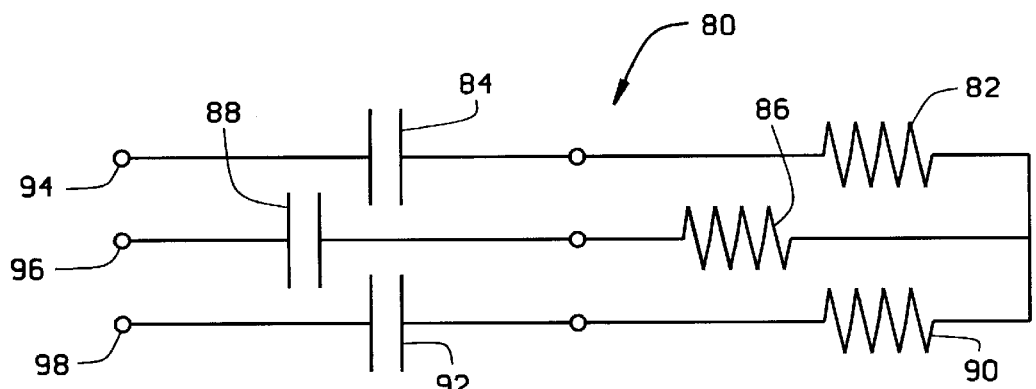
FIG. 4 is a circuit schematic diagram of a three-phase wye connected termination network for the motor shown in FIG. 1.

FIG. 4 illustrates a circuit schematic diagram of a three-phase wye connected network terminator 80 for connection to a network termination assembly similar to network termination assembly 40 described in FIG. 1. Network terminator 80 includes a first resistor 82 and a first capacitor 84 connected in series across a first phase of motor 10, a second resistor 86 and a second capacitor 88 connected in series across a second phase, and a third resistor 90 and a third capacitor 92 connected in series across a third phase. First resistor 82, second resistor 86, and third resistor 90 are connected in parallel with each other and each of the resistor and capacitor series-connections are connected through a plurality of terminals 94, 96, and 98 to a corresponding supply motor line of a three-phase motor, e.g., motor 10 as shown in FIG. 1.

Network terminator 80 will reduce the voltage between motor terminals 94, 96, 98 and a transmission line (not shown) connected to a pulse width modulated drive (not shown) when high frequency surges or spikes occur. The values for resistors 82, 86, 90 and capacitors 84, 88, 92 are chosen such that the high frequency surge impedance approximately matches that of a cable (not shown) connected to electric motor 10 (shown in FIG. 1) and are further chosen for varying voltage, impedance, temperature, and power characteristics. In one embodiment, the value for resistors 82, 86, 90 are within the range of about 30 to 150 ohms. In an alternative embodiment, the value for resistors 82, 86, 90 are within the range of about 60 to 120 ohms. In a further embodiment, resistors 82, 86, 90 have a nominal resistive average of about 90 ohms.

Figure 5:
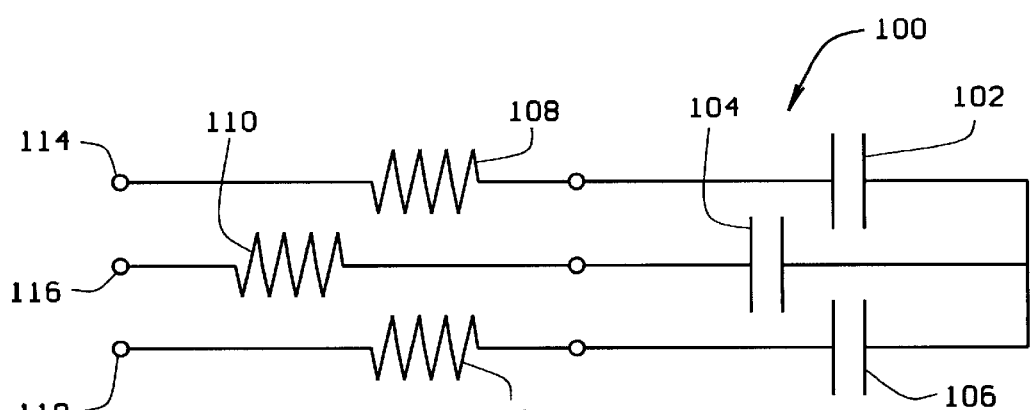
FIG. 5 is a circuit schematic diagram of an alternative embodiment of a three-phase wye connected termination network for the motor shown in FIG. 1.

FIG. 5 is a circuit schematic diagram of an alternative embodiment of a three-phase wye connected network terminator 100. Circuit 100 includes a first capacitor 102, a second capacitor 104, and a third capacitor 106 connected in parallel with each other. First capacitor 102 is connected in series across a first phase of motor 10 with a first resistor 108. Second capacitor 104 is connected in series across a second phase of motor 10 with a second resistor 110. Third capacitor 106 is connected in series across a third phase of motor 10 with a third resistor 112. Each set of resistor and capacitor series-connections is connected to a corresponding supply motor line (not shown) of three-phase motor 10 through a plurality of terminals 114, 116, and 118.

Network terminator 100 will reduce the voltage between motor terminals 114, 116, 118 and a transmission line (not shown) connected to a pulse width modulated drive (not shown) when high frequency surges or spikes occur. The values for resistors 108, 110, 112 and for capacitors 102, 104, 106 are selected such that the high frequency surge impedance approximately matches that of a cable (not shown) connected to electric motor 10 (shown in FIG. 1).

Figure 6:
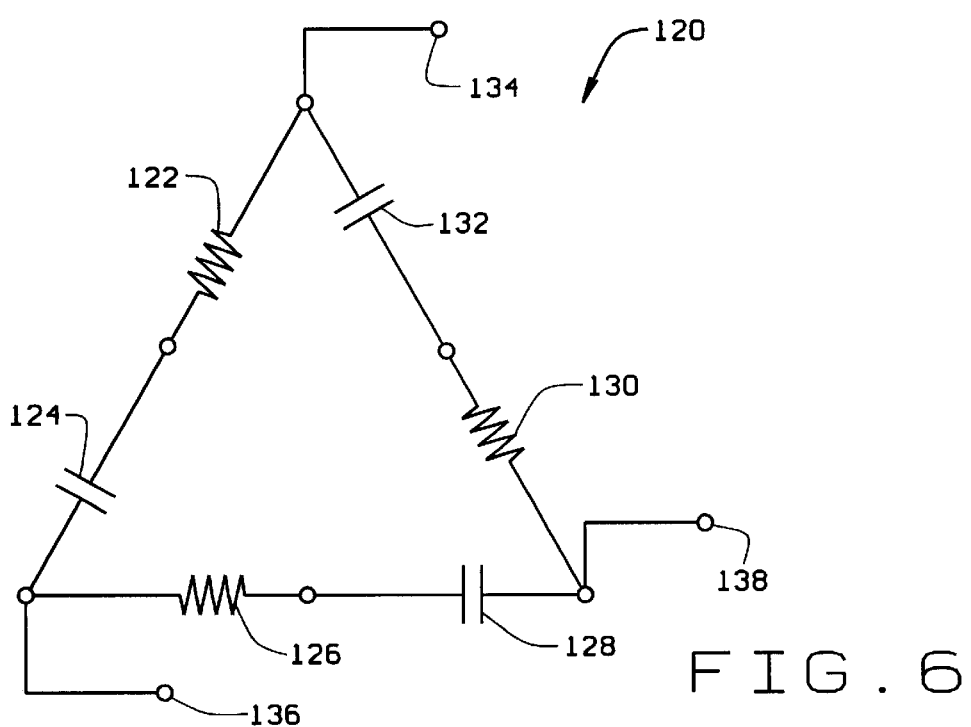
FIG. 6 is a circuit schematic diagram of a three-phase delta connected termination network for the motor shown in FIG. 1.

FIG. 6 illustrates a circuit schematic diagram of a three-phase delta connected network terminator 120 for connection to the supply motor lines (not shown) of a three-phase motor 10. The circuit 120 includes a first resistor 122 and a first capacitor 124 connected in series across the first phase of the motor 10, a second resistor 126 and a second capacitor 128 connected in series across the second phase, and a third resistor 130 and a third capacitor 132 connected in series across the third phase. Network terminator 120 includes three terminals 134, 136, and 138 to allow connections to supply motor lines (not shown) of three-phase motor 10.

Network terminator 120 will reduce the voltage between motor terminals 134, 136, 138 and a transmission line (not shown) connected to a pulse width modulated drive (not shown) when high frequency surges or spikes occur. Resistors 122, 126, 130 and capacitors 124, 128, 132 have values selected such that a high frequency surge impedance approximately matches that of a cable (not shown) connected to three-phase electric motor 10. In network terminator 120, the value selected for each resistor 122, 126, 130 is the same across each phase of the motor. Additionally, the value selected for each capacitor 124, 128, 132 is the same across each phase of the motor.

When pulse voltage is transmitted on the supply motor line (not shown) connected at terminal 134, capacitor 132 is initially uncharged and operates as a short circuit. The value of resistor 130 is chosen such that the high frequency surge impedance approximately matches that of the supply motor line (not shown) connected at terminal 134 and that of the supply motor line (not shown) connected at terminal 138. Under these circumstances, the pulse voltage transmitted to motor 10 and to the stator end windings (not shown) is minimized.

As the pulse voltage is transmitted to terminal 134, capacitor 132 becomes charged. As a result of capacitor 132 being charged, resistor 130 is effectively removed from between the supply motor lines (not shown) connected at terminals 134 and 136 and most of the voltage in the high amplitude pulse is reduced by capacitor 132. As a result, the remaining voltage is at a much less amplitude and is safely transmitted to the end windings (not shown) without damaging motor 10. It should be noted that network terminators 80 and 100 operate similarly.

A method of assembling a network termination assembly includes integrally mounting a network terminator 80, 100, 120 to line termination network assembly 50. Network terminator 80, 100, 120 is electrically connected to motor 10 using electrical cables (not shown). Network termination assembly 50 may be mounted within shell 14 and is positioned in close proximity to one or both of the end windings (not shown). Alternatively, if motor 10 includes an outlet box 28, network termination assembly 60 is mounted to outlet box 28. Alternatively, network terminator assembly 40 is mounted to motor 10 between motor 10 and outlet box 28.

Network terminator 80 is assembled by connecting three resistors 82, 86, 90 and three capacitors 84, 88, 92 in series across each phase of the motor. Then, each series connected set of resistors and capacitors is connected in parallel. When assembling a network terminator 80, 100, 120 for use with three-phase motor 10, a wye or delta configuration can be used.

A network termination assembly, as explained above, can be integrally installed and reliably used with an electric motor to reduce the peak voltage between a motor terminal and a transmission line. The reduced voltage allows motors with typical insulation systems to be used on adjustable speed drives without requiring special magnet wire or additional insulation systems. Further, the network termination assembly will not adversely effect sinusoidal performance ratings of the motor on which it is used. In addition, since the network termination assembly is integral with the motor, the network termination assembly can be installed during assembly of the motor, thus lowering the cost of installation.

While the invention has been described in terms of various specific embodiments, those skilled in the art will recognize that the invention can be practiced with modifications within the spirit and scope of the claims.

What is claimed is:

1. An electric motor including:
    a shell;
    a stator positioned in said shell;
    a rotor positioned within said stator;
    a pair of end shields connected to said shell;
    a cable connected to said electric motor; and
    a network terminator integral with said motor and connected to said cable, said network terminator configured to produce a high frequency surge impedance approximately equal to a high frequency surge impedance of said cable.

2. An electric motor in accordance with claim 1 wherein said motor further includes an outlet box, said network terminator mounted to said motor between said box and said motor.

3. An electric motor in accordance with claim 1 further comprising:
    a cavity formed by said shell and said end shields; and
    a pair of end windings within said cavity, said network terminator positioned within said cavity in close proximity to at least one of said end windings.

4. An electric motor in accordance with claim 1 wherein said network terminator comprises a first resistor and a first capacitor connected in series.

5. An electric motor in accordance with claim 1 wherein said network terminator comprises:
    a second resistor and a second capacitor; and
    a third resistor and a third capacitor, said first resistor and first capacitor connected in series across a first phase of said motor, said second resistor and second capacitor connected in series across a second phase of said motor, and said third resistor and third capacitor connected in series across a third phase of said motor.

6. An electric motor in accordance with claim 5 wherein said first resistor, said second resistor, and said third resistor are connected in parallel.

7. An electric motor in accordance with claim 1 wherein said motor is a three phase motor.

8. An electric motor in accordance with claim 1 wherein said network termination comprises a plurality of capacitors and a plurality of resistors, each capacitor connected to a corresponding resistor in series.

9. An electric motor in accordance with claim 8 wherein said capacitors are connected in parallel.

10. An electric motor in accordance with claim 9 wherein said network terminator has a wye configuration.

11. An electric motor in accordance with claim 9 wherein said network terminator has a delta configuration.

* * * * *